Figure 1:
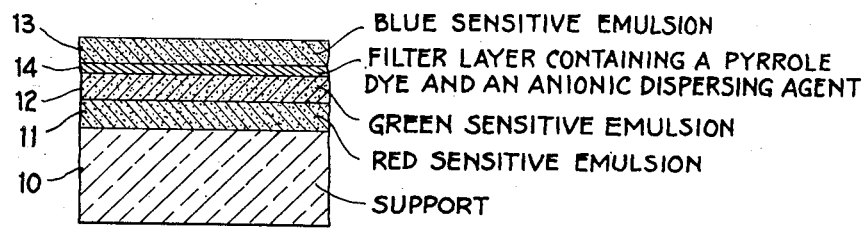

JULES A. WIDMER
BURT H. CARROLL
INVENTORS

Patented July 30, 1946

2,405,106

UNITED STATES PATENT OFFICE 2,405,106

PHOTOGRAPHIC FILTER AND ANTIHALATION LAYERS

Jules Arthur Widmer, Oak Ridge, Tenn., and Burt H. Carroll, Rochester, N. Y., assignors to Eastman Kodak Company, Rochester, N. Y., a corporation of New Jersey Application October 27, 1944, Serial No. 560,626

5 Claims. (Cl. 95—8)

This invention relates to photography and particularly to filter and antihalation layers for photographic elements.

Dyes which can be used successfully, by direct dispersion in gelatin, for the preparation of filter layers in contact with photographic emulsions are very rare. Such dyes must have good spectral absorption properties and be readily dispersible in gelatin without crystallization. In addition, such dyes should bleach readily in photographic processing baths, should not diffuse in multi-layer coatings, nor either sensitize or desensitize the emulsion layers with which they are in contact. It is difficult to find dyes which fulfill all of these requirements. The pyrrole dyes of Brooker and Sprague U. S. Patents 2,268,798 and 2,298,731 are satisfactory in many respects for use in filter and antihalation layers but do not fulfill all of the necessary requirements.

We have found that many of the properties of the pyrrole dyes of the Brooker and Sprague patents may be improved by dispersing the dyes with an excess of an anionic dispersing agent. Such dispersing agents include water-soluble salts of alkyl naphthalene sulfonates, water-soluble salts of esters of sulfoaliphatic dicarboxylic acids, and tannic acid.

The accompanying drawing shows sectional views of photographic film constructed according to our invention.

The pyrrole dyes which we propose to use are polymethine dyes having a conjugated methine chain joining two heterocyclic nuclei, at least one of which nuclei is a pyrrole nucleus. In addition to the dyes disclosed in the Brooker and Sprague U. S. Patents 2,268,798 and 2,298,731, the following are suitable:

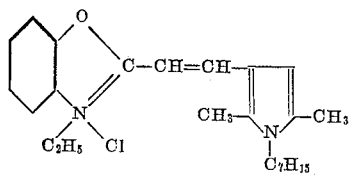

[3-ethyl-2-benzoxazole]-[2,5-dimethyl-1-heptyl-pyrrole(3)]-dimethincyanine chloride

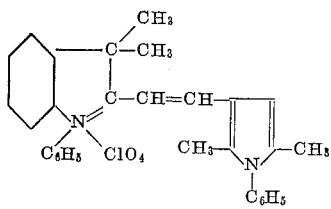

[3,3-dimethyl-1-phenyl-indolenine (2)]-[2,5-dimethyl-1-phenyl pyrrole (3)]-dimethincyanine perchlorate

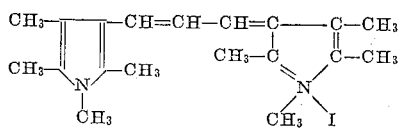

Bis-[1,2,4,5-tetramethyl pyrrole-(3)]-trimethincyanine iodide

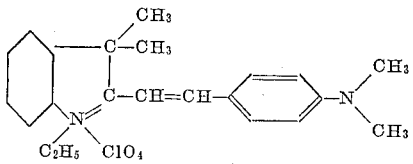

2-p-dimethylamino-styryl-1-ethyl-3,3-dimethyl-4,5-benzoindolenium perchlorate

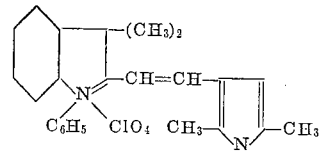

[1-n-heptyl-2,5-dimethyl pyrrole-(3)]-[3,3-dimethyl-1-phenylindolenine-(2)]-dimethincyanine perchlorate

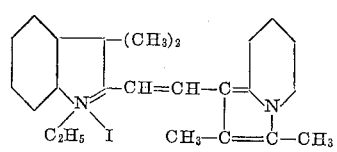

[1-ethyl-3,3-dimethyl indole-(2)]-[2,3-dimethyl-pyrrocoline-(1)]-dimethincyanine iodide

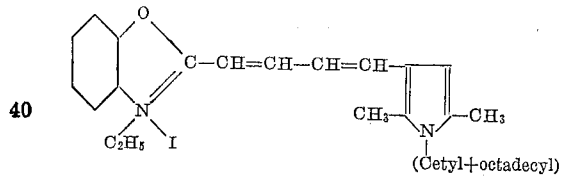

[3-ethyl-2-benzoxazole]-[1-cetyl+octadecyl(mixture)-2,5-dimethyl pyrrole(3)]-tetramethincyanine iodide.

The anionic dispersing agents which may be used with the pyrrole dyes include water-soluble salts of alkyl naphthalene sulfonates, such as Alkanol B sold by E. I. du Pont de Nemours & Company, Nekal A sold by General Dyestuff Corporation, Novonacco sold by National Aniline and Chemical Company, Inc., and Aerosol OS sold by American Cyanamid and Chemical Corporation. These compounds are generally sold as the sodium salts, for example, Aerosol OS is isopropyl naphthalene sodium sulfonate. Other water-soluble salts may, however, be used.

Another class of anionic dispersing agents which we may employ is that of the water-soluble salts of esters of sulfo aliphatic dicarboxylic acids, such as Aerosol AY and Aerosol OT sold by American Cyanamid and Chemical Corporation. Aerosol AY is the diamyl ester of sodium sulfosuccinic acid and Aerosol OT is the dioctyl ester of sodium sulfosuccinic acid. Water-soluble salts other than the sodium salts may be used.

A third type of dispersing agent which we may use for the pyrrole dyes is tannic acid or tannin.

The pyrrole dye and the anionic dispersing agent used according to our invention should be chosen so that in equivalent quantities they form a difficultly soluble precipitate which is colloidally dispersed by an excess of the anionic material. This procedure has several advantages which permit the use of pyrrole dyes not otherwise applicable to filter layers for multi-layer photographic elements. The true solubility of the pyrrole dye in water can be reduced to an extremely low value, thus preventing diffusion while retaining good dispersability in colloidal form. In addition, many dyes which in a purified state crystallize readily from gelatin layers so that their dispersion in sufficient tinctorial strength is poor, can be incorporated in gelatin with greatly reduced tendencies to crystallize. Further advantages are improved spectral absorption and increased fastness to heat and moisture. Fading is usually retarded by the anionic material which presumably combines with the pyrrole dyes to give an insoluble and more stable salt.

Our invention will be further illustrated by reference to the following examples:

*Example 1*

To 25 cc. of a 10% gelatin solution at pH 6.3 diluted with 20 cc. of water, there were added 50 milligrams of [3-ethyl-2-benzoxazole]-[2,5-dimethyl-1-heptylpyrrole (3)]-dimethincyanine chloride dissolved in 3 to 5 cc. of methyl alcohol. To this was added 4 cc. of 5% solution of Aerosol OT in a solution containing 50% methyl alcohol and 50% water. This yielded a heavy yellow gel which when coated on a glass or film support dried to give a clear yellow coating. The dye in this coating did not diffuse when immersed in tap water, whereas the dye-forming coating made up in a similar manner by omitting the Aerosol OT diffused almost completely into tap water in 30 minutes.

*Example 2*

A coating was made in the same manner as in Example 1 but using as the dye [3,3-dimethyl-1-phenylindolenine (2)]-[2,5-dimethyl-1-phenylpyrrole (3)]-dimethincyanine perchlorate. A clear orange coating was obtained which on microscopic examination was found to be free from crystallization. A similar coating without the Aerosol OT crystallized quite badly.

*Example 3*

A coating was made as in Example 1 but using as the dye bis-[1,2,4,5-tetramethylpyrrole (3)]-trimethincyanine iodide. This coating was found to be free from diffusion and crystallization of the dye.

*Example 4*

A coating was made as in Example 1 but using as the dye 2-p-dimethylamino-styryl-1-ethyl-3,3-dimethyl-4,5-benzoindolenium perchlorate. The dispersion of the dye was greatly improved by the Aerosol OT and diffusion was found to be prevented.

*Example 5*

A coating was made as in Example 1 but using as the dye [1-n-heptyl-2,5-dimethylpyrrole (3)]-[3,3-dimethyl-1-phenylindolenine (2)]-dimethincyanine perchlorate. The coating was found to be free from diffusion.

*Example 6*

A coating was made as in Example 1 but using as the dye [1-ethyl-3,3-dimethyl-indole (2)]-[2,3-dimethyl-pyrrocoline (1)]-dimethincyanine iodide. Diffusion of the dye was found to be considerably reduced over a similar coating not containing the dispersing agent.

*Example 7*

Dyed gelatin for a coating was made as in Example 1 but omitting the dispersing agent and using as the dye [3-ethyl-2-benzoxazole]-[1-cetyl+octadecyl (mixture)-2,5-dimethyl pyrrole (3)]-tetramethincyanine iodide. Considerable fading of the dye resulted upon holding this gel at 40° C. for four hours. Similar gels made with the addition of 0.1 to 0.2 gram of Aerosol OT, Alkanol B or Nekal A before the dye was added showed no fading of the dye in four hours at 40° C.

It will be evident from a consideration of the pyrrole dyes described above that the dyes which we use may have either a pyrrole nucleus or an indole nucleus, substituted or unsubstituted, at the end of a polymethine chain and that the opposite end of the polymethine chain may be attached either to a similar or dissimilar pyrrole or indole nucleus or to an aromatic nucleus. Where we refer to "pyrrole nucleus" it is to be understood that we intend to include both pyrrole and indole nuclei, the indole nucleus being considered a substituted pyrrole and the term, pyrrole nucleus, being generic to both pyrrole and indole nuclei.

The amount of pyrrole dye used in filter and antihalation layers according to our invention will generally vary from about 50 milligrams to about 150 milligrams of dye in 25 cc. of 10% gelatin solution. The dispersing agent is used in excess of the equivalent amount of the dye so that an excess of the dispersing agent is present in the dispersion.

In the accompanying drawing, we have shown photographic elements coated according to our invention. As shown therein, Fig. 1 illustrates a multi-layer photographic element having a support 10 of cellulose acetate or other suitable material filtered with successive layers 11, 12 and 13, sensitive respectively to the red, green and blue spectral regions. Between layers 12 and 13, there is coated a layer 14 of gelatin containing a pyrrole dye and an anionic dispersing agent for the dye.

Figure 2:
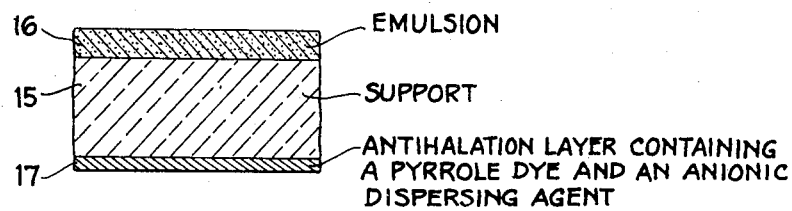

Fig. 2 illustrates a photographic element comprising a support 15 of cellulose acetate or other suitable material having on one side thereof a sensitive emulsion layer 16 and on the other side an antihalation layer 17 containing pyrrole dye and an anionic dispersing agent according to our invention.

While we have shown the use of our invention in filter and antihalation layers, it is obvious that the dispersion of dye and dispersing agent may be applied in other positions in the photographic element. For example, the dispersions may be used in overcoating layers or in filter layers between any two of the emulsion layers of a multi-layer element or between the emulsion layer and the support. Supports of glass, cellulose ester, synthetic resin, paper, metal, or other suitable material may be used.

The examples and modifications included herein are to be considered as illustrative only and our invention is to be limited only by the scope of the appended claims.

We claim:

1. A photographic element comprising a support having thereon a light-sensitive layer and a layer containing a colloidal dispersion of (1) a polymethine dye having a conjugated methine chain joining two heterocyclic nuclei, at least one of which nuclei is a pyrrole nucleus, and (2) an amount in excess of the equivalent amount of said dye of an anionic dispersing agent selected from the class consisting of water-soluble salts of alkyl naphthalene sulfonates, water-soluble salts of esters of sulfo aliphatic dicarboxylic acids, and tannic acid.

2. A photographic element comprising a support having thereon a plurality of layers sensitive to different regions of the visible spectrum and between two of said layers a layer containing a colloidal dispersion of (1) a polymethine dye having a conjugated methine chain joining two heterocyclic nuclei, at least one of which nuclei is a pyrrole nucleus, and (2) an amount in excess of the equivalent amount of said dye of an anionic dispersing agent selected from the class consisting of water-soluble salts of alkyl naphthalene sulfonates, water-soluble salts of esters of sulfo aliphatic dicarboxylic acids, and tannic acid.

3. A photographic element comprising a support having thereon a light-sensitive layer and a layer containing a colloidal dispersion of a polymethine dye having a conjugated methine chain joining two heterocyclic nuclei, at least one of which nuclei is a pyrrole nucleus, and an amount in excess of the equivalent amount of said dye of a water-soluble salt of an alkyl naphthalene sulfonate.

4. A photographic element comprising a support having thereon a light-sensitive layer and a layer containing a colloidal dispersion of a polymethine dye having a conjugated methine chain joining two heterocyclic nuclei, at least one of which nuclei is a pyrrole nuclus, and an amount in excess of the equivalent amount of said dye of a water-soluble salt of an ester of a sulfo aliphatic dicarboxylic acid.

5. A photographic element comprising a support having thereon a light-sensitive layer and a layer containing a colloidal dispersion of a polymethine dye having a conjugated methine chain joining two heterocyclic nuclei, at least one of which nuclei is a pyrrole nucleus, and an amount in excess of the equivalent amount of said dye of tannic acid.

JULES ARTHUR WIDMER.
BURT H. CARROLL.